(12) United States Patent
Takeda

(10) Patent No.: US 11,170,951 B2
(45) Date of Patent: Nov. 9, 2021

(54) METHOD OF MANUFACTURING ELECTRIC CONTACT

(71) Applicant: Uchiya Thermostat Co., Ltd., Saitama (JP)

(72) Inventor: Hideaki Takeda, Misato (JP)

(73) Assignee: Uchiya Thermostat Co., Ltd., Saitama (JP)

( * ) Notice: Subject to any disclaimer, the term of this patent is extended or adjusted under 35 U.S.C. 154(b) by 295 days.

(21) Appl. No.: 16/085,740

(22) PCT Filed: Dec. 8, 2016

(86) PCT No.: PCT/JP2016/086469
§ 371 (c)(1),
(2) Date: Sep. 17, 2018

(87) PCT Pub. No.: WO2017/168851
PCT Pub. Date: Oct. 5, 2017

(65) Prior Publication Data
US 2019/0088424 A1 Mar. 21, 2019

(30) Foreign Application Priority Data

Apr. 1, 2016 (JP) .............................. JP2016-074327

(51) Int. Cl.
*H01H 11/04* (2006.01)
*H01R 43/02* (2006.01)
(Continued)

(52) U.S. Cl.
CPC ............ *H01H 11/043* (2013.01); *H01H 1/02* (2013.01); *H01H 11/06* (2013.01); *B23K 11/002* (2013.01); *H01R 43/02* (2013.01)

(58) Field of Classification Search
None
See application file for complete search history.

(56) References Cited

U.S. PATENT DOCUMENTS 4,259,557 A * 3/1981 Takano ................ H01H 11/042
200/275
4,357,751 A * 11/1982 Akimoto ............ B23K 11/3009
29/33 M
(Continued)

FOREIGN PATENT DOCUMENTS

JP 5449565 A 4/1979
JP 54050870 A 4/1979
(Continued)

OTHER PUBLICATIONS

"International Application Serial No. PCT/JP2016/086469 , International Search Report dated Feb. 21, 2017", (Feb. 21, 2017), 5 pgs.
(Continued)

*Primary Examiner* — Devang R Patel
(74) *Attorney, Agent, or Firm* — Schwegman Lundberg & Woessner, P.A.

(57) ABSTRACT

A method of manufacturing an electric contact includes a welding step of welding a contact material (12) to a base material (11), and a crushing step of crushing the contact material (12), wherein one or more absorption holes (11*a* and 11*b*) that absorb deformation of the base material (11) in a thickness direction (Z direction) caused by the crushing of the contact material (12) are formed around the welding position of the contact material (12) on the base material (11).

5 Claims, 17 Drawing Sheets

(51) Int. Cl.
  *H01H 11/06*   (2006.01)
  *H01H 1/02*    (2006.01)
  *B23K 11/00*   (2006.01)

(56) References Cited

U.S. PATENT DOCUMENTS

| | | | | |
|---|---|---|---|---|
| 4,429,458 | A | * | 2/1984 | Shibata ................ H01H 11/041 |
| | | | | 228/3.1 |
| 4,488,356 | A | * | 12/1984 | Gust ...................... H01H 11/04 |
| | | | | 200/267 |
| 4,489,228 | A | * | 12/1984 | Wells ..................... B23K 11/16 |
| | | | | 219/118 |
| 4,821,412 | A | * | 4/1989 | Tani ......................... B21K 1/62 |
| | | | | 228/3.1 |
| 5,140,114 | A | | 8/1992 | Sunaga et al. |
| 8,196,300 | B2 | * | 6/2012 | Imamura .............. B23K 20/123 |
| | | | | 29/879 |
| 2001/0002511 | A1 | * | 6/2001 | Zaleski ................ H01H 11/042 |
| | | | | 29/882 |

FOREIGN PATENT DOCUMENTS

| | | | |
|---|---|---|---|
| JP | 54126963 | A | 10/1979 |
| JP | 57003316 | A | 1/1982 |
| JP | 59018319 | U | 2/1984 |
| JP | 02276116 | A | 11/1990 |
| JP | 04368723 | A | 12/1992 |
| JP | 05282960 | A | 10/1993 |

OTHER PUBLICATIONS

"International Application Serial No. PCT/JP2016/086469, Written Opinion ated Feb. 21, 2017", (Feb. 21, 2017), 4 pgs.

"Japanese Application Serial No. 2018-508382, Office Action dated Apr. 13, 2020", w/ English Translation, (Apr. 13, 2020), 8 pgs.

* cited by examiner

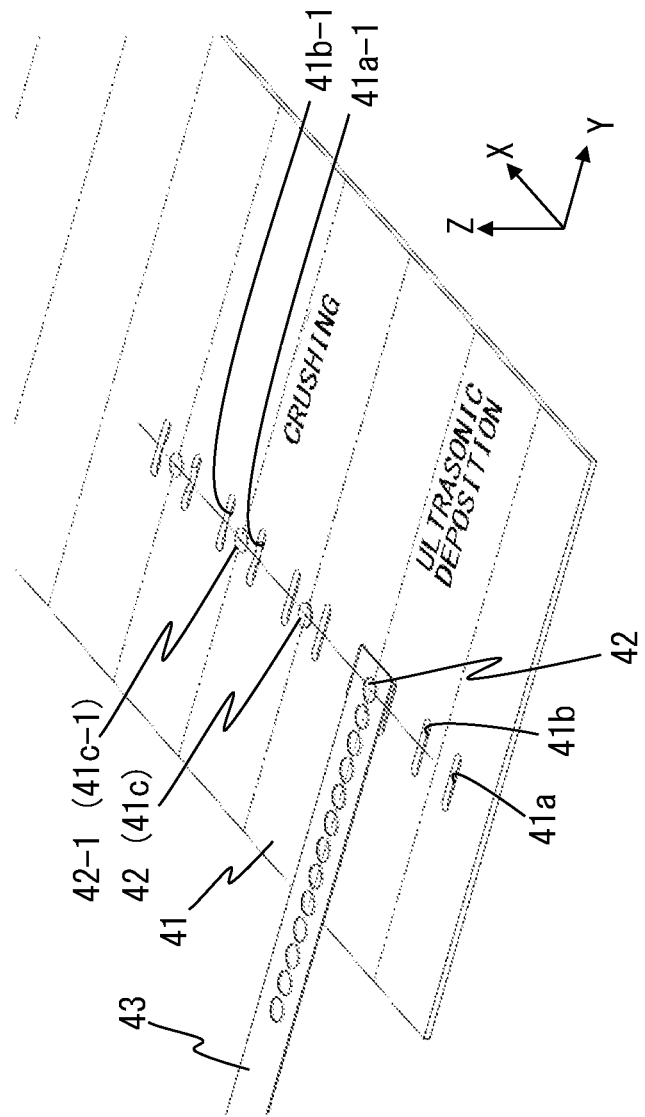
F I G. 4 A

METHOD OF MANUFACTURING ELECTRIC CONTACT

PRIORITY APPLICATIONS

This application is a U.S. National Stage Filing under 35 U.S.C. 371 from International Application No. PCT/JP2016/086469, filed on Dec. 8, 2016, and published as WO2017/168851 on Oct. 5, 2017, which claims the benefit of priority to Japanese Application No. 2016-074327, filed on Apr. 1, 2016; the benefit of priority of each of which is hereby claimed herein, and which applications and publication are hereby incorporated herein by reference in their entirety.

FIELD

The present invention is related to a method of manufacturing an electric contact by which an electric contact is formed on a base material.

BACKGROUND

A method in which a noble-metal material is provided, in a horizontal direction, to the upper surface of a contact material that is in advance fixed to the upper surface of the base material so as to achieve compression bonding has been known as a conventional method of manufacturing an electric contact by which a contact material is attached to a base material (see Patent Document 1 for example).

A method has also been known, in which a contact material is fit into a convex portion of the base material, the contact material is rolled with a grooved roller, which has concave groove, and thereby a contact having part or whole of the contact material projecting from the base material is manufactured (see Patent Document 2 for example).

A method has also been known, in which an attachment hole having a ring-shaped concave portion and tapered portions at the upper and lower ends is provided to the base material so that a contact material is swaged while it is passing through the attachment hole (see Patent Document 3 for example).

A method has also been known, in which an attachment hole is formed on the base material while the base material is being conveyed progressively, a contact material is provided in a direction orthogonal to the base material, the contact material is inserted into the above attachment hole, a swaging process is performed, and thereby the necessary portion is punched out (see Patent Document 4 for example).

PRIOR ART DOCUMENT

Patent Document

[Patent Document 1] Japanese Laid-open Patent Publication No. S54-49565
[Patent Document 2] Japanese Laid-open Patent Publication No. S54-126963
[Patent Document 3] Japanese Laid-open Patent Publication No. H04-368723
[Patent Document 4] Japanese Laid-open Patent Publication No. H05-282960

SUMMARY

Technical Problem

Incidentally, press working or roll working performed on a contact material on a base material so as to crush the contact material causes the base material to deform so that a portion of the base material equivalent to the volume of the contact material embedded in the base material overflows from the area surrounding the contact material in the step of embedding the contact material in the base material.

It is an object of the present invention to provide a method of manufacturing an electric contact by which deformation in the thickness directions of the base material caused by crushing a contact material on the base material can be absorbed.

Solution to Problem

According to one aspect, a method of manufacturing an electric contact includes a welding step of welding a contact material to a base material, and a crushing step of crushing the contact material, wherein one or more absorption holes that absorb deformation of the base material in a thickness direction caused by the crushing of the contact material are formed around the welding position of the contact material on the base material.

Advantageous Effects of Invention

According to the above aspect, deformation in the thickness directions of the base material caused by crushing a contact material on the base material can be absorbed.

BRIEF DESCRIPTION OF DRAWINGS

FIG. 4A is a perspective view for explaining the method of manufacturing an electric contact according to the fourth embodiment;

DESCRIPTION OF EMBODIMENTS

Figure 1A:
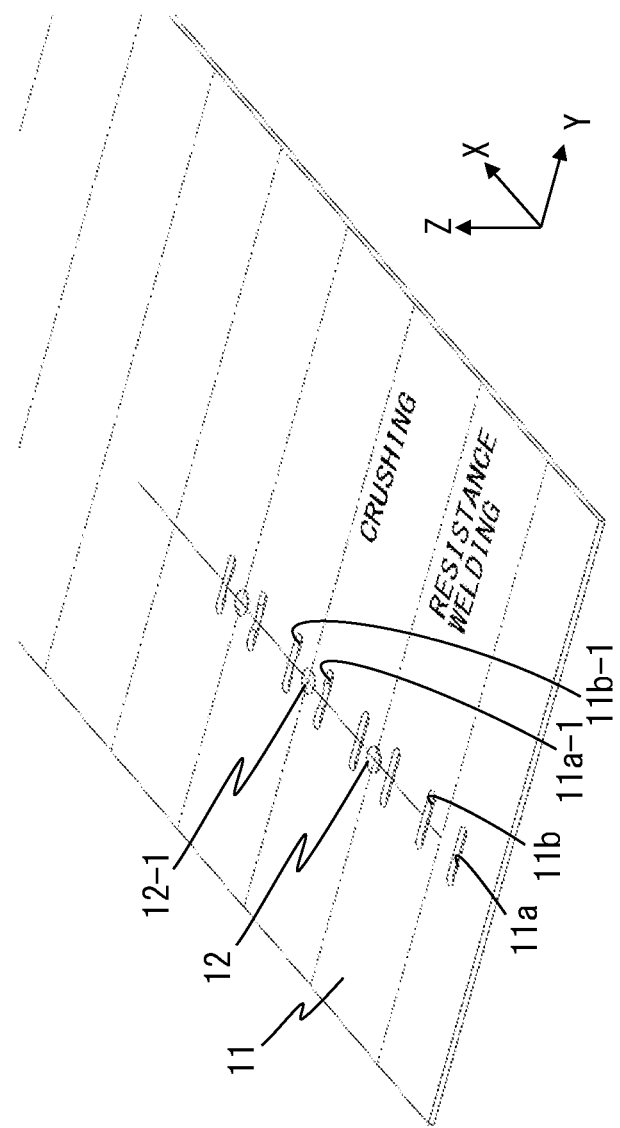
FIG. 1A is a perspective view for explaining the method of manufacturing an electric contact according to the first embodiment.

Explanations will be hereinafter given for the methods of manufacturing an electric contact according to the first through sixth embodiments by referring to the drawings.

First Embodiment

Figure 1B:
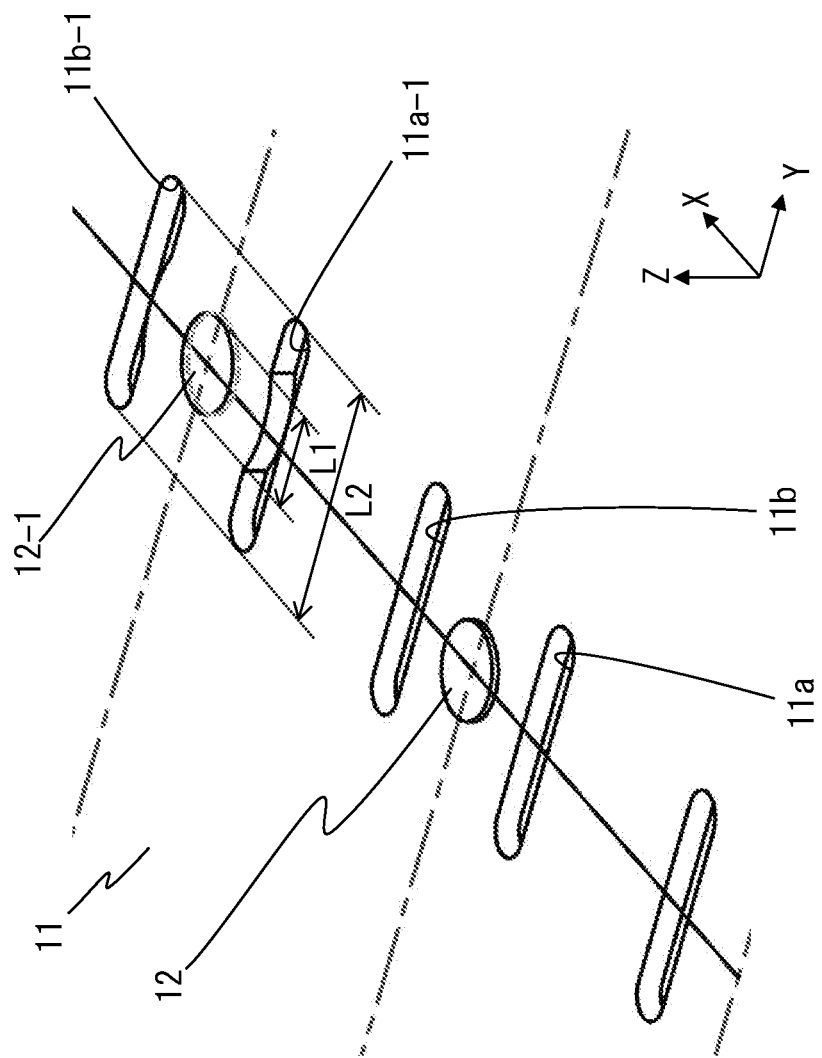
FIG. 1B is an enlarged perspective view for explaining the method of manufacturing an electric contact according to the first embodiment.

FIG. 1A and FIG. 1B are respectively a perspective view and an enlarged perspective view for explaining the method of manufacturing an electric contact according to the first embodiment.

Note that the X directions and the Y directions specified in FIG. 1A and FIG. 1B and in FIG. 2A through FIG. 7A, which will be referred to later, are horizontal directions that are orthogonal to each other, and the Z directions are vertical directions. However, these X directions, Y directions, and Z directions are just for facilitating the explanations, and the directions specified in the explanations are just exemplary.

As illustrated in FIG. 1A, a base material 11 is made of a metal material, and has a shape of a belt extending in the X directions and having the thickness in the Z directions or a shape of a rectangular plate extending in the X directions and the Y directions and having the thickness in the Z directions. The base material 11 has its longitudinal directions coinciding with the X directions, and receives a welding step and a crushing step while being intermittently conveyed (progressively or stepwisely) to the near side in the X directions in FIG. 1A.

First, pairs of slotted holes 11a and 11b, which are long in the Y directions, are formed (absorption-hole formation step) around the welding positions of contact materials 12 on the base material 11 (intersections between the solid line running in the X directions and the plurality of dashed-dotted lines running in the Y directions), the slotted holes 11a and 11b facing each other in each pair having the welding position between them. The slotted holes 11a and 11b are examples of one or more absorption holes that absorb deformation in the thickness directions (the Z directions) of the base material 11 that is caused by the crushing of the contact materials 12, which will be described later. While the slotted holes 11a and 11b may be depressions that do not pierce the base material 11, it is desirable that the slotted holes 11a and 11b be through holes piercing the base material 11 in view of the absorption of deformation (distortion) in the thickness directions (the Z directions) of the base material 11.

As illustrated in FIG. 1B, each of the slotted holes 11a and 11b has an open portion with length L2 that is greater in the longitudinal directions (the Y directions) than diameter L1 (L2>L1) of the contact material 12-1, which is an electric contact that has been crushed and shaped as will be described later. Also, the slotted holes 11a and 11b are formed in such a manner that they face the contact materials 12 in the lateral directions (the X directions) of the open portions. Note that while the slotted holes 11a and 11b having semicircular portions at both ends in the longitudinal directions (the Y directions) are illustrated, the slotted holes 11a and 11b may be rectangular, without round portions.

The total volume of one or more absorption holes formed around the welding position, i.e., the sum of the volumes of the slotted holes 11a and 11b is greater than or equal to the volume of the portion, of the contact material 12, that is press fit into the base material 11. Note that when there is only one absorption hole, the total volume is equal to the volume of that one absorption hole.

Next, the contact materials 12 are welded to the base material 11 (welding step). In an example of resistance welding, the contact material 12 has its linear (or wire-shaped) tip portion pushed against the base material 11 in the vertically lower direction (Z direction) so as to allow the flowing of a welding current, has the tip portion joined to the base material 11, and thereafter is cut at a position at which a prescribed amount of the contact material 12 is left on the base material 11. There is a method in which the contact material 12 is provided in the vertical direction (Z direction) as described above. In such a case, the part that holds the contact material 12 being pushed against the base material 11 is connected to one of the electrodes, and the bottom surface of the base material 11 is connected to the other of the electrodes.

When the linear the contact material 12 has been welded to the base material 11, the linear the contact material 12 is cut, leaving a desired amount of the contact material 12 on the base material 11. When the contact material 12 is cut while being pressed to be crushed with a pair of blades, the material above the cut portion will have a linear vertex facing downward. This shape functions as a projection that concentrates the welding currents. While the part of the contact material 12 below the cut portion and on the base material 11 will have a linear vertex facing upward, the part may have a nearly flat surface (upper surface) depending upon the shape of the blades.

There is also a method in which the contact material 12 is provided horizontally (in the Y directions) from a contact-material-providing belt-shaped member, which will be described in the third embodiment. In both methods, while one welding current joins the contact material 12 to the base material 11 and shapes the contact material 12, a welding current may flow twice in some cases. The purpose of flowing a welding current twice is to cause energization heating with the second welding current so as to widen the melting range (nugget) by pressing and compressing the contact material 12 so as to shape the contact material 12 after flowing the first welding current to achieve welding, which will be described later in the fifth embodiment.

Figure 7A:
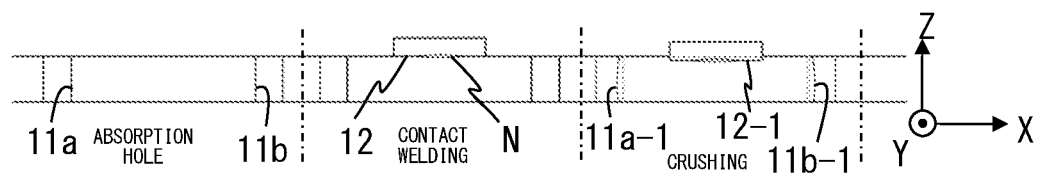
FIG. 7A is a sectional view for explaining the method of manufacturing an electric contact according to the first embodiment.

The welding step results in the formation of nugget N, which is a portion melted through welding, at the center of the bottom surface of the contact material 12 as illustrated in FIG. 7A. The contact material 12 may include a plurality of layers so as to allow the formation of a clad contact, which includes gold, gold alloy, or the like only on the surface.

Next, the contact material 12 is crushed (crushing step). In this crushing step, for example a mold is used to press and shape the contact material 12 in such a manner that the contact material 12-1 after being crushed has a flat surface. Further, the bottom surface side of the contact material 12 is partially press fit into the base material 11 in the crushing step as illustrated in FIG. 7A (the contact material 12-1). The deformation of the base material 11, caused by the contact material 12 being press fit into the base material 11, that expands radially in the X direction and the Y direction from the portion below the contact material 12 is accommodated by the slotted holes 11a and 11b. Thereby, the thickness of the base material 11 remains unchanged, while the volumes of the slotted holes 11a and 11b (slotted holes 11a-1 and 11b-1) become smaller. Note that, it is desirable in the crushing step that the contact material 12 be press fit into the base material 11 only to a depth smaller than half the thickness of the base material 11 before the crushing of that contact material 12. Note that while an example of pressing the contact material 12 to crush it is described, the contact material 12 may be crushed by a different method such as rolling etc.

Figure 7B:
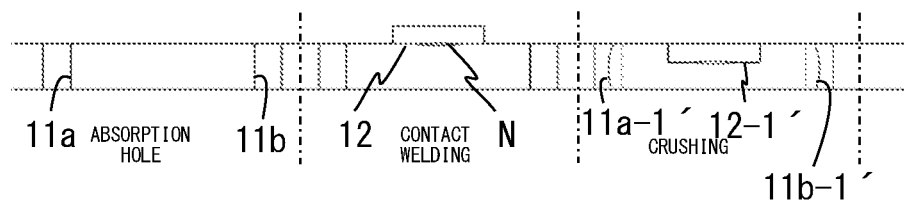
FIG. 7B is a sectional view for explaining the method of manufacturing an electric contact according to a variation example of the first embodiment.

Also, the contact material 12 may be crushed to an extent that the crushed contact material 12-1' has its surface coplanar with the surface of the base material 11 so that the contact material 12-1' is entirely press fit into the base material 11 as illustrated in FIG. 7B. In such a case, the total volume of the slotted holes 11b-1' and 11b-2' is smaller than the total volume of the slotted holes 11b-1 and 11b-2 resulting from only partially press fitting the contact material 12-1 into the base material 11. It is desirable also in the crushing step of this case that the contact material 12-1' be press fit into the base material 11 only to a depth smaller than half the thickness of the base material 11.

According to the first embodiment described above, the method of manufacturing an electric contact includes a welding step of welding the contact material 12 to the base material 11 and a crushing step of crushing the contact material 12. Also, the slotted holes 11a and 11b are formed around the welding positions the contact materials 12 on the base material 11 as examples of one or more absorption holes that absorb deformation of the base material 11 in the thickness directions (the Z directions) caused by the crushing of the contact materials 12.

While press working or roll working performed on the contact material 12 on the base material 11 so as to crush the contact material 12 causes the base material 11 to deform so that the base material 11 overflows from the area surrounding the contact material 12 in the step of embedding the contact material 12-1 in the base material 11, the slotted holes 11a and 11b can accommodate such deformation. Thus, the first embodiment enables the absorption of deformation of the base material 11 in the thickness directions (the Z directions) caused by the crushing of the contact material 12 on the base material 11.

Further, losses of materials for the contact materials 12 can be suppressed, enabling inexpensive manufacture of electric contacts. Also, the rolling step in the crushing step and the annealing step, which will be described later, can be omitted, leading to simple and inexpensive manufacture of electric contacts through the reduction of the number of steps of working. Also, the welding step performed prior to the crushing step enables the contact material 12 to be electrically attached to the base material 11 surely. This also secures the reliability of the electric contacts.

Also, according to the first embodiment, when the contact material 12 is crushed to an extent that the crushed contact material 12 has its surface coplanar with the surface of the base material (the contact material 12-1') in the crushing step as illustrated in FIG. 7B, it is possible to avoid the limitation of the thickness of the electric contact so as to reduce the device size. In another view, the base material 11 without projections can be obtained, which is advantageous when for example using electric contacts with the base material 11 in a bent state. While entirely embedding the contact material 12 in the base material 11 causes greater deformation of the base material 11 in the thickness directions (the Z directions) than when partially embedding the contact material 12 in the base material 11, the slotted holes 11a-1' and 11b-1' can accommodate this greater deformation.

Also, the contact material 12 is press fit into the base material 11 only to a depth smaller than half the thickness of the base material 11 before that contact material 12 is crushed in the crushing step in the first embodiment. This can secure the strength of the base material 11.

Also, the total volume of the slotted holes 11a and 11b, which are examples of one or more absorption holes, is greater than or equal to the volume of the portion, of the contact material 12, that is press fit into the base material 11 in the first embodiment. This enables the slotted holes 11a-1 and 11b-1 to more securely absorb deformation of the base material 11 in the thickness directions (the Z directions).

Also, each of the slotted holes 11a and 11b, which are examples of absorption holes, has an open portion with length L2 that is greater in the longitudinal directions (the Y directions) than diameter (diameter of the contact) L1 (L2>L1) of the crushed contact material 12, and faces the contact material 12 in a lateral direction (X direction) of the opening portion in the first embodiment. This makes it easier for the slotted holes 11a and 11b to accommodate deformation of the base material 11, enabling more secure absorption of deformation of the base material 11 in the thickness directions (the Z directions).

Second Embodiment

Figure 2A:
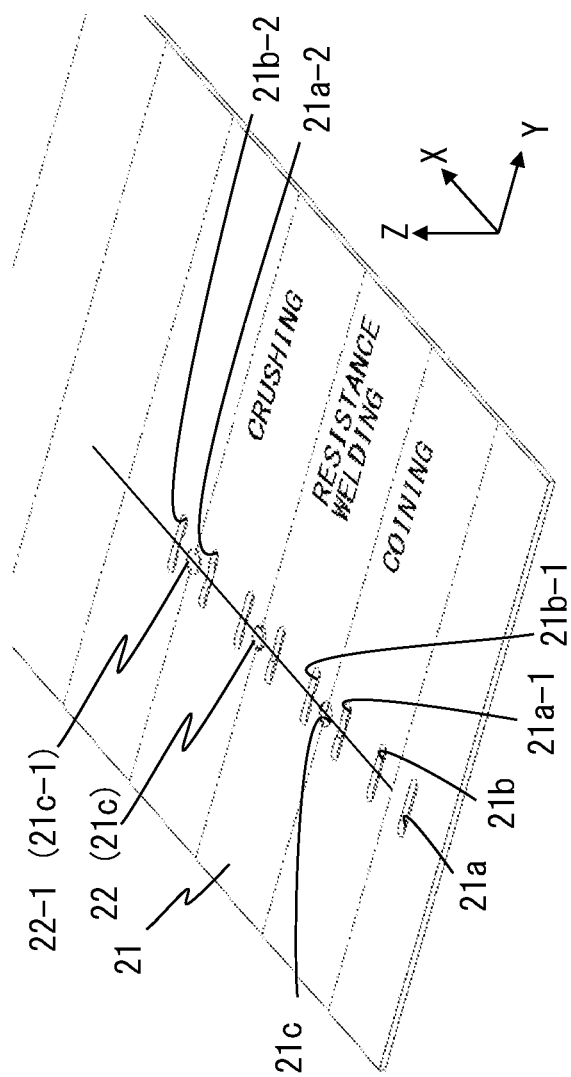
FIG. 2A is a perspective view for explaining the method of manufacturing an electric contact according to the second embodiment.
Figure 2B:
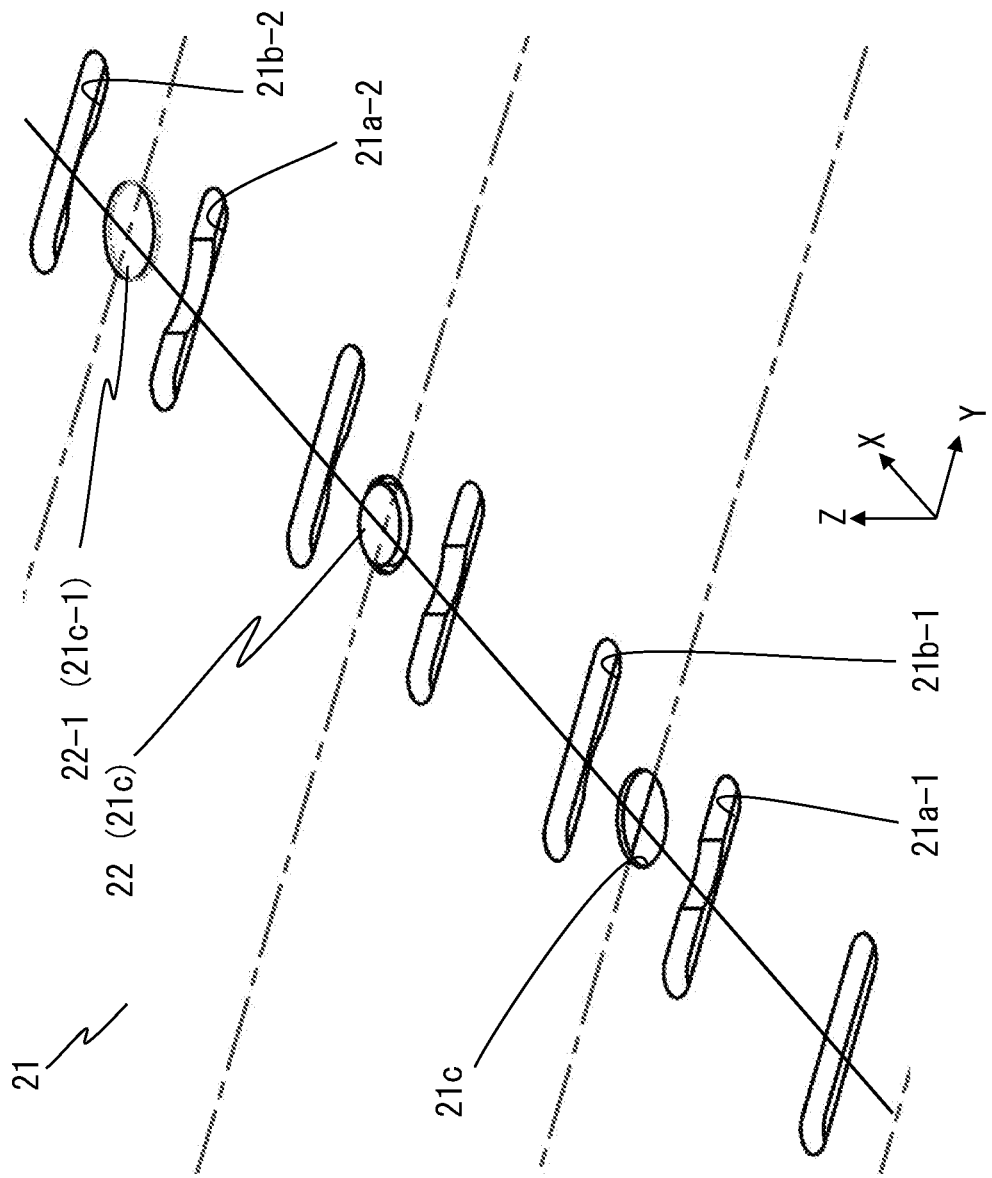
FIG. 2B is an enlarged perspective view for explaining the method of manufacturing an electric contact according to the second embodiment.

FIG. 2A and FIG. 2B are respectively a perspective view and an enlarged perspective view for explaining the method of manufacturing an electric contact according to the second embodiment.

The second embodiment is different from the first embodiment only in that a concave-portion-formation step of forming a concave portion 21c for accepting part of the welded contact material 22 is performed prior to the welding step, and thus detailed explanations will be omitted.

First, pairs of slotted holes 21a and 21b, which are long in the Y directions, are formed (absorption-hole formation step) around the welding positions of contact materials 22 on a base material 21, the slotted holes 21a and 21b facing each other in each pair having the welding position between them as illustrated in FIG. 2A and FIG. 2B.

Next, the concave portion 21c that accepts part of the welded contact material 22 is formed through coining (concave-portion formation step). This concave portion 21c makes the width of the open portion greater than the contact material 22 before being welded, and thereby can facilitate the accommodation of deformation of the contact material 12 that is crushed in the crushing step, which will be described later. Also, the provision of the concave portion 21c having a volume smaller than or equal to that of the welded contact material 22 can prevent the generation of a gap in the concave portion 21c after the crushing of the contact material 22.

Figure 7C:
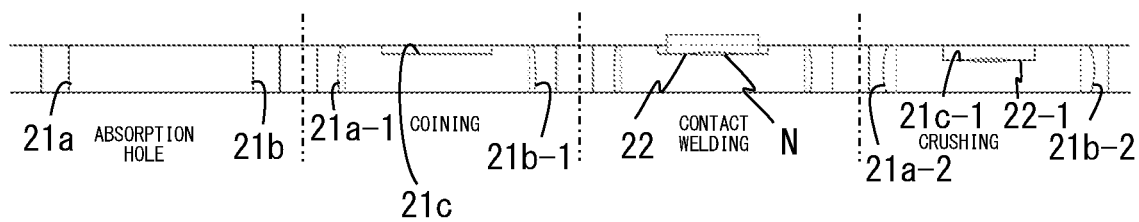
FIG. 7C is a sectional view for explaining the method of manufacturing an electric contact according to the second embodiment.

As illustrated in FIG. 7C, the formation of the concave portion 21c on the base material 21 caused by plastic deformation also causes the base material 21 to deform, leading to the reduction in the volumes of the slotted holes 21a and 21b (slotted holes 21a-1 and 21b-1). As described above, because the concave-portion formation step also causes the base material 21 to deform, the slotted holes 21a and 21b are formed prior to the formation of the concave portion 21c.

Next, the contact material 22 is welded to the base material 21 (welding step). Then, the contact material 22 is crushed (crushing step). The contact material 22 is entirely press fit into the base material 21 in this crushing step as illustrated in FIG. 7C (the contact material 22-1). The slotted holes 21a-1 and 21b-1 also accommodate the deformation of the base material 21 caused by this the contact material 22 being press fit into the base material 21, further reducing the volumes of the slotted holes 21a-1 and 21b-1 (slotted holes 21a-2 and 21b-2). Note that the crushing of the contact material 22 causes the concave portion 21c to have the same volume as that of the contact material 22 (21c-1).

The aspects of the above-described second embodiment similar to those of the above first embodiment can achieve effects similar to those achieved by the first embodiment, i.e., effects including the ability to absorb deformation of the base material 21 in the thickness directions (the Z directions) caused by the crushing of the contact material 22 on the base material 21.

Also, the concave-portion formation step, which is performed prior to the welding step, forms the concave portion 21c for accepting part of the welded contact material 22, and the slotted holes 21a and 21b, which are examples of one or more absorption holes, are formed prior to the formation of the concave portion 21c. This enables the slotted holes 21a and 21b to absorb deformation of the base material 21 in the thickness directions (the Z directions) at a time when the concave portion 21c, which assists in press fitting the contact material 22 into the base material 21, is formed, similarly to a time of the crushing.

Third Embodiment

Figure 3A:
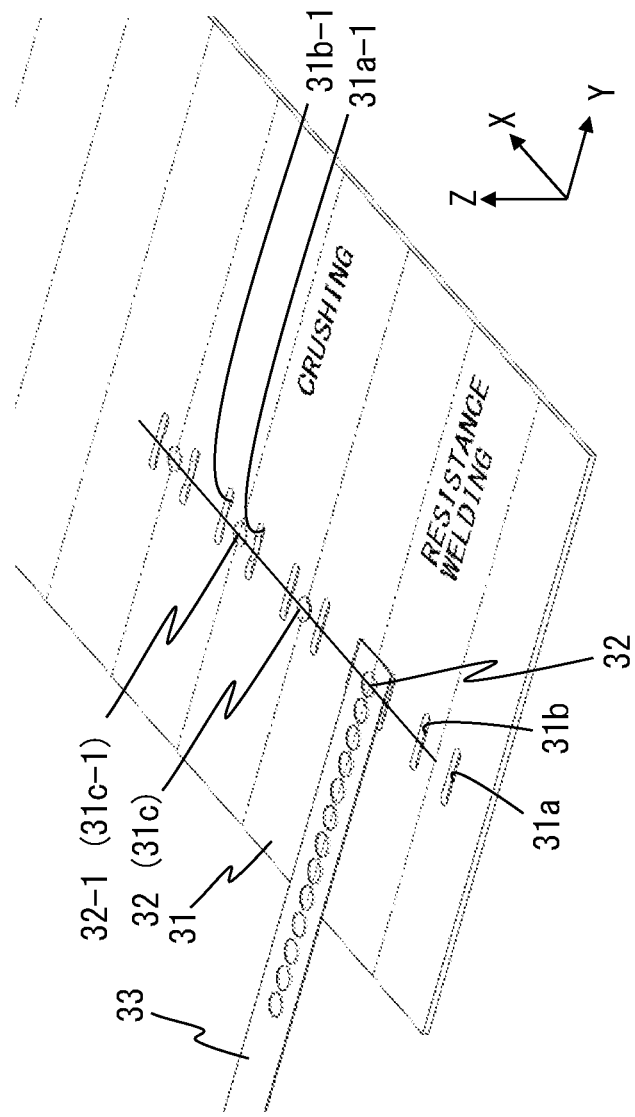
FIG. 3A is a perspective view for explaining the method of manufacturing an electric contact according to the third embodiment.
Figure 3B:
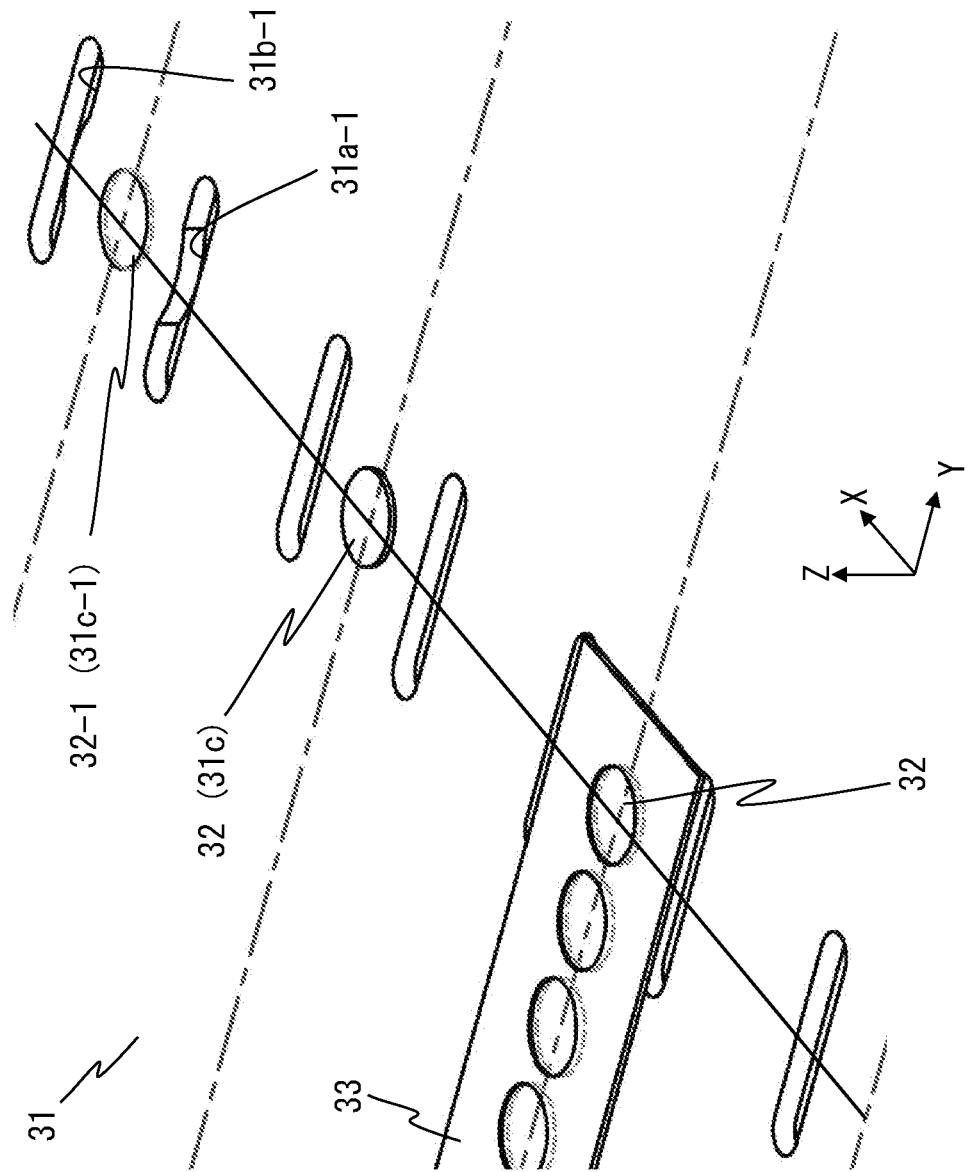
FIG. 3B is an enlarged perspective view for explaining the method of manufacturing an electric contact according to the third embodiment.

FIG. 3A and FIG. 3B are respectively a perspective view and an enlarged perspective view for explaining the method of manufacturing an electric contact according to the third embodiment.

The third embodiment is different from the first embodiment in that a contact material 32 is provided from a contact-material-providing belt-shaped member 33 and can be similar to the first and second embodiments for the other aspects, and thus detailed explanations will be omitted.

First, pairs of slotted holes 31a and 31b, which are long in the Y directions, are formed (absorption-hole formation step) around the welding positions of contact materials 32 on a base material 31, the slotted holes 31a and 31b facing each other in each pair having the welding position between them as illustrated in FIG. 3A and FIG. 3B.

Next, the contact material 32 is welded to the base material 31 (welding step). In this welding step, the contact materials 32 are provided to the base material 31 from the contact-material-providing belt-shaped member 33 that is intermittently conveyed in the Y directions, which are orthogonal to the conveyance directions (X directions) of the base material 31.

The contact materials 32 belonging to the contact-material-providing belt-shaped member 33 are once punched out, thereafter are roughly half pushed back to the contact-material-providing belt-shaped member 33 in the direction (upward in the Z directions) opposite to the punching-out direction (downward in the Z directions), and are conveyed in this state. This method using punching out and pushing back is referred to as a push-back method. Note that the contact material 32 may be provided by cutting one portion of the contact-material-providing belt-shaped member 33 at a time starting from the first portion or may be provided by separating the contact material 32 from the contact-material-providing belt-shaped member 33 after the welding.

The contact material 32 may have for example a two-layer structure using different materials for the top and bottom surface sides with a layer of a different material pasted as the bottom surface side. It is desirable that the contact material 32 of the above two-layer structure have the bottom surface side having a resistivity or melting point lower than the top surface side, and the bottom surface side is made of for example a brazing filler metal.

Next, the contact material 32 is crushed by for example having its entirety press fit into the base material 31 (crushing step). The aspects of the above-described third embodiment similar to those of the above first and second embodiments can achieve effects similar to those achieved by the first and second embodiments, i.e., effects including the ability to absorb deformation of the base material 31 in the thickness directions (the Z directions) caused by the crushing of the contact material 32 on the base material 31.

Also, the contact materials 32 are welded to the base material 31 with the base material 31 and the contact-material-providing belt-shaped member 33 being intermittently conveyed in the directions that cross each other in the third embodiment. This enables continuous manufacture of electric contacts.

Fourth Embodiment

Figure 4B:
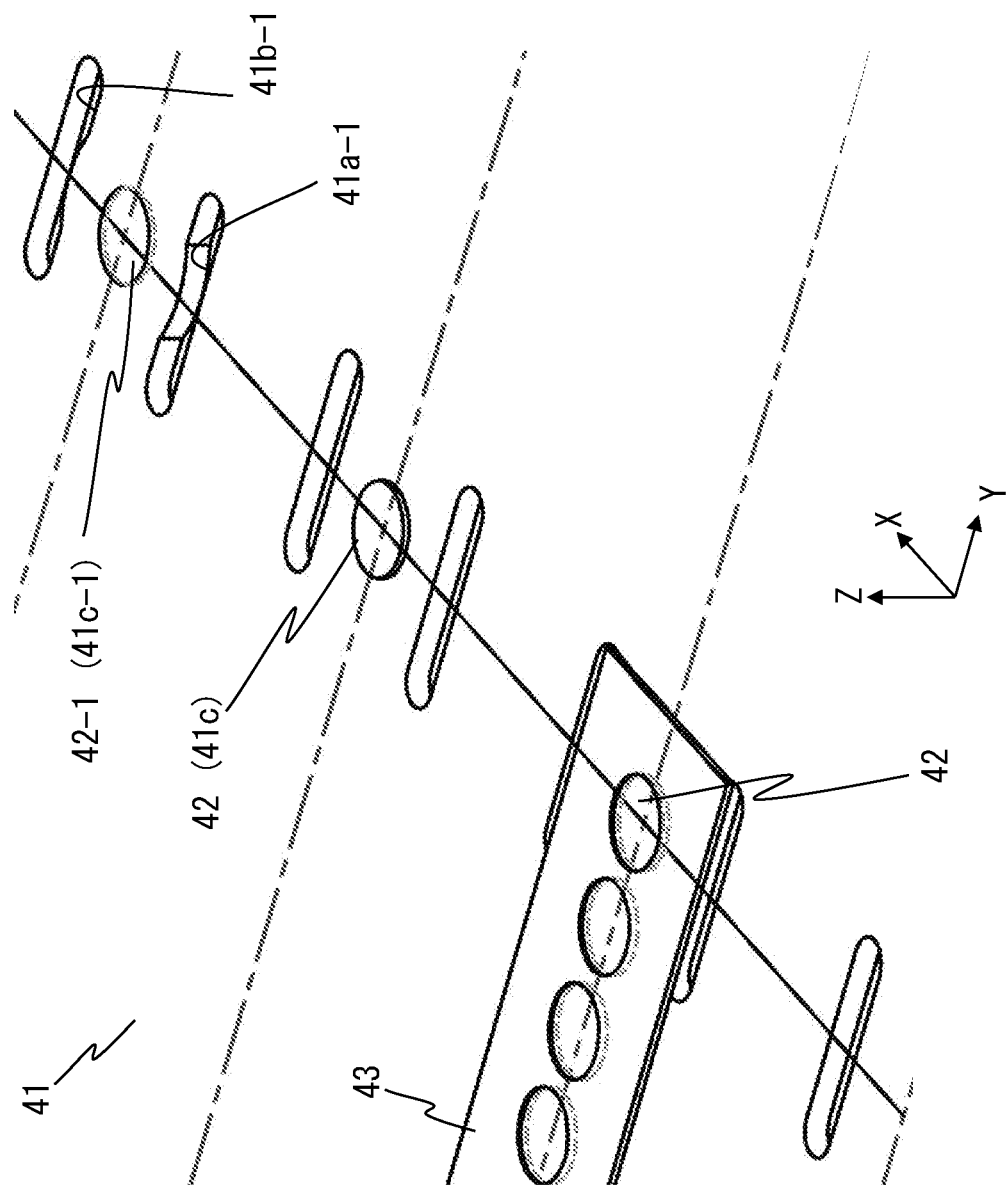
FIG. 4B is an enlarged perspective view for explaining the method of manufacturing an electric contact according to the fourth embodiment.

FIG. 4A and FIG. 4B are respectively a perspective view and an enlarged perspective view for explaining the method of manufacturing an electric contact according to the fourth embodiment.

The fourth embodiment is different from the third embodiment in that ultrasonic welding is used instead of the resistance welding in the welding step and can be similar to the first through third embodiments for the other aspects, and thus detailed explanations will be omitted.

Figure 7D:
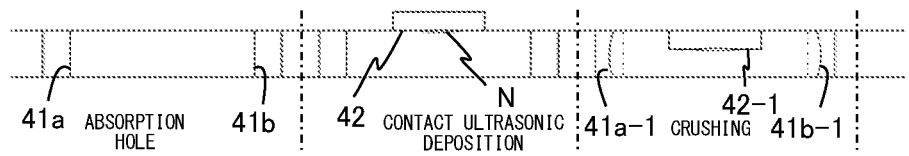
FIG. 7D is a sectional view for explaining the method of manufacturing an electric contact according to the fourth embodiment.

First, pairs of slotted holes 41a and 41b, which are long in the Y directions, are formed (absorption-hole formation step) around the welding positions of contact materials 42 on a base material 41, the slotted holes 41a and 41b facing each other in each pair having the welding position between them as illustrated in FIG. 4A, FIG. 4B, and FIG. 7D.

Next, the contact materials 42 are welded to the base material 41 (welding step). In this welding step, contact materials 42 are provided to the base material 41 from a contact-material-providing belt-shaped member 43 that is intermittently conveyed in the Y directions, which are orthogonal to the conveyance directions (X directions) of the base material 41.

The contact material 42 is pulled out from the contact-material-providing belt-shaped member 43, and ultrasound based on horizontal vibration is applied with the contact material 42 pushed by the tip of the horn against the base material 41. This application of the ultrasound generates very large momentary friction between the contact material 42 and the base material 41, which causes deposition between them. In actuality, the deposition has to be performed after completely separating the contact material 42 from the contact-material-providing belt-shaped member 43 in order to prevent influence of the horn vibration on the contact-material-providing belt-shaped member 43.

Next, the contact material 42 is crushed by for example having its entirety press fit into the base material 41 (crushing step). Because the contact material 42 has concavities and convexities on its surface to prevent the base material 41 from slipping, and the contact material 42 is crushed and shaped to an extent that the surfaces of the contact material 42 and the base material 41 become specular (or become bright) after the deposition in the welding step through the above ultrasonic deposition. An annealing step would soften the contact material 42 that has been hardened through working such as this crushing. If this annealing step is to be performed, it is better to perform it under a condition that the contact material 42 includes a first layer made of for example silver on the surface side and a second layer having a melting point lower than that of the first layer, made of for example silver solder, and having a contact surface for the base material 41, and that the temperature is lower than the melting point of the first layer (for example a temperature that is lower than or equal to 90 percent of the melting point of the first layer). This annealing may be performed through energization.

The aspects of the above-described fourth embodiment similar to those of the above first through third embodiments can achieve effects similar to those achieved by the first through third embodiments, i.e., effects including the ability to absorb deformation of the base material 41 in the thickness directions (the Z directions) caused by the crushing of the contact material 42 on the base material 41.

Also, the contact material 42 is welded to the base material 41 through ultrasonic deposition in the fourth embodiment, enabling the welding step through a method different from those of the resistance welding of the above first through third embodiments.

Also, when the contact material 42 includes a first layer and a second layer having a melting point lower than that of the first layer and having a contact surface for the base material 41 and the annealing step in which annealing is performed at a temperature lower than the melting point of the first layer is performed after the crushing step, the contact material 42 that has been hardened through working of the crushing step can be softened in the fourth embodiment.

Fifth Embodiment

Figure 5A:
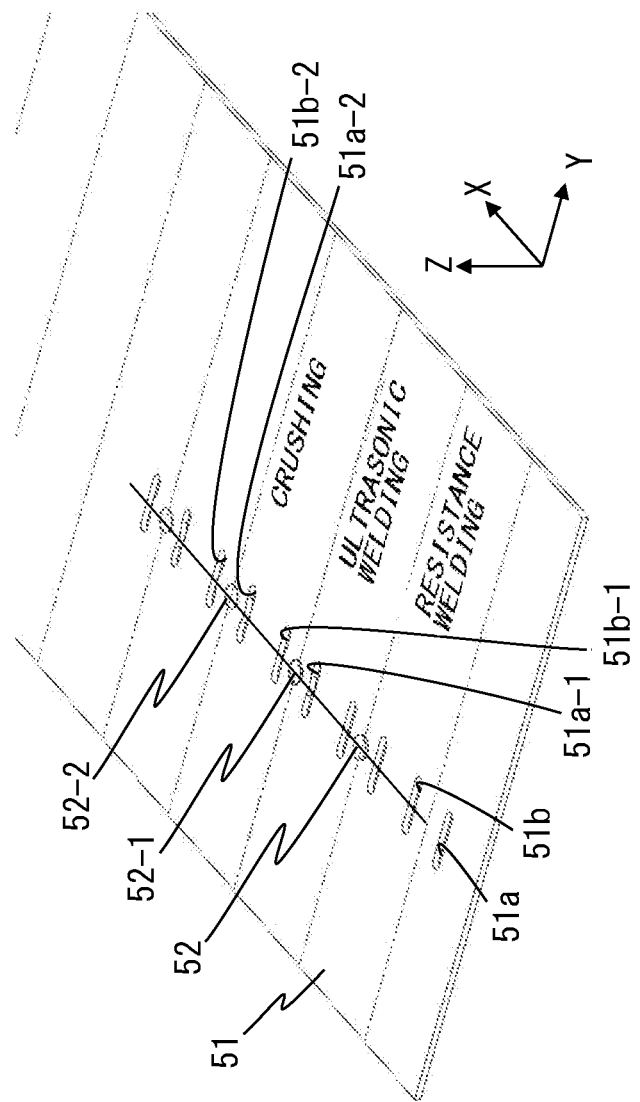
FIG. 5A is a perspective view for explaining the method of manufacturing an electric contact according to the fifth embodiment.
Figure 5B:
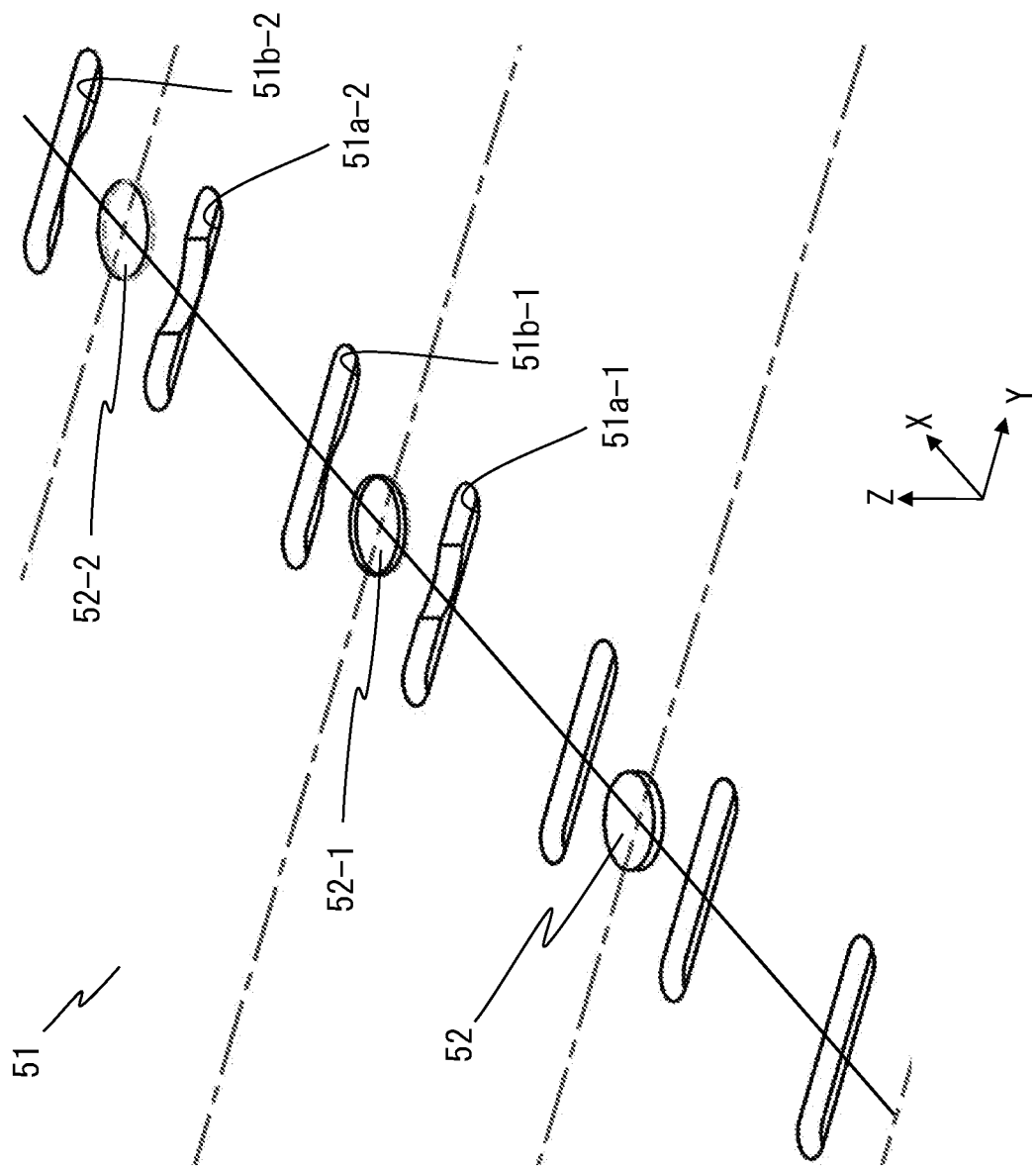
FIG. 5B is an enlarged perspective view for explaining the method of manufacturing an electric contact according to the fifth embodiment.

FIG. 5A and FIG. 5B are respectively a perspective view and an enlarged perspective view for explaining the method of manufacturing an electric contact according to the fifth embodiment.

The fifth embodiment is different from the first embodiment in that both resistance welding and ultrasonic welding are performed in the welding step and can be similar to the first through fourth embodiments for the other aspects, and thus detailed explanations will be omitted.

First, pairs of slotted holes 51a and 51b, which are long in the Y directions, are formed (absorption-hole formation step) around the welding positions of contact materials 52 on a base material 51, the slotted holes 51a and 51b facing each other in each pair having the welding position between them as illustrated in FIG. 5A and FIG. 5B.

Next, the contact material 52 is welded to the base material 51 (welding step). In this welding step, the contact material 52 is welded to the base material 51 through resistance welding, and the contact material 52 is shaped through pressing and compression (the contact material 52-1) so as to be embedded in the base material 51. In this process, deformation of the base material 51 reduces the volumes of the slotted holes 51a and 51b (the slotted holes 51a-1 and 51b-1). Note that this process does not necessarily have to include pressing on the contact material 52.

Figure 7E:
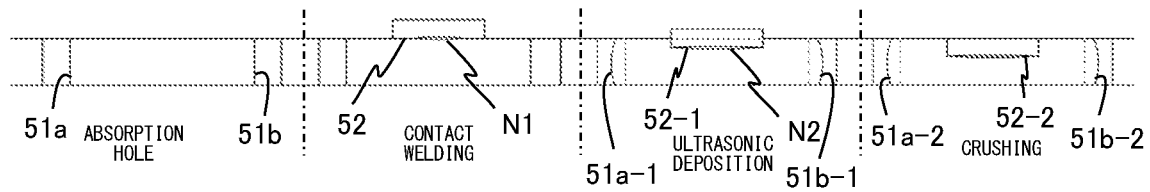
FIG. 7E is a sectional view for explaining the method of manufacturing an electric contact according to the fifth embodiment.

Thereafter, ultrasonic deposition utilizing horizontal vibration described in the fourth embodiment is performed. Then, the ultrasonic deposition generates nugget N2 from nugget N1 formed at the center of the bottom surface of the contact material 52 through the resistance welding, nugget N2 expanding over the entirety of the bottom surface of the contact material 52 as illustrated in FIG. 7E.

Next, the contact material 52-1 is crushed by for example having its entirety press fit into the base material 51 (crushing step). This deforms the base material 51, leading to a further reduction in the volumes of the slotted holes 51a-1 and 51b-1 (the slotted holes 51a-2 and 51b-2).

The aspects of the above-described fifth embodiment similar to those of the above first through fourth embodiments can achieve effects similar to those achieved by the first through fourth embodiments, i.e., effects including the ability to absorb deformation of the base material 51 in the thickness directions (the Z directions) caused by the crushing of the contact material 52 on the base material 51.

Also, in the fifth embodiment, the contact material 52 is welded to the base material 51 through resistance welding and thereafter the contact material 52 is welded to the base material 51 through ultrasonic deposition that utilizes horizontal vibration in the welding step. This forms nugget N2 expanding on the bottom surface of the contact material 52, which can prevent the contact material 52 from peeling off the base material 51.

Sixth Embodiment

Figure 6A:
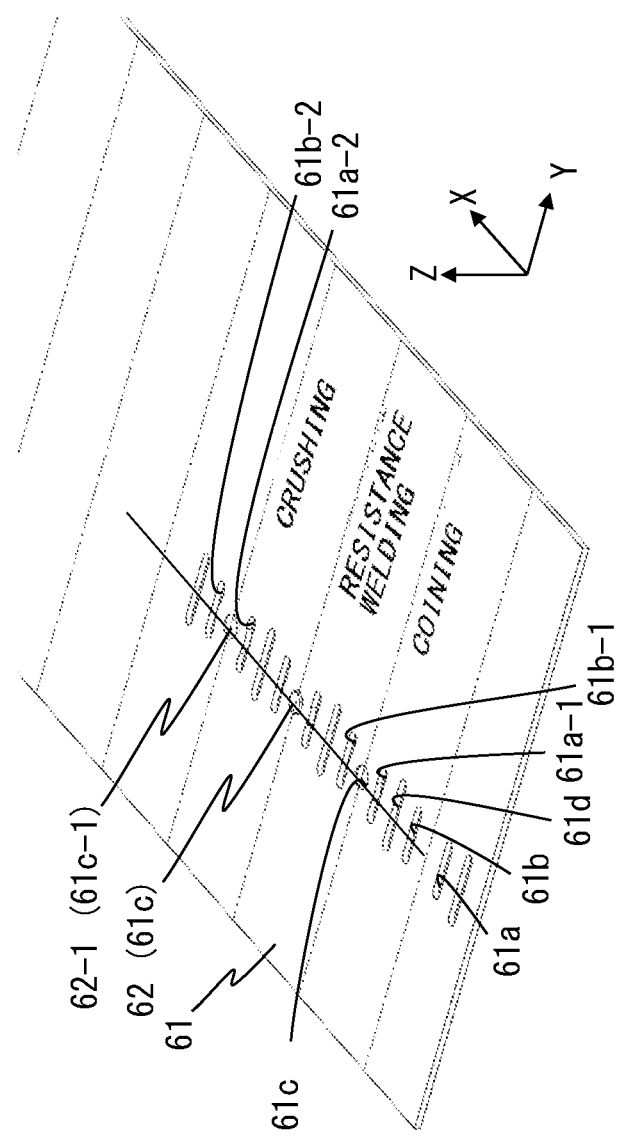
FIG. 6A is a perspective view for explaining the method of manufacturing an electric contact according to the sixth embodiment.
Figure 6B:
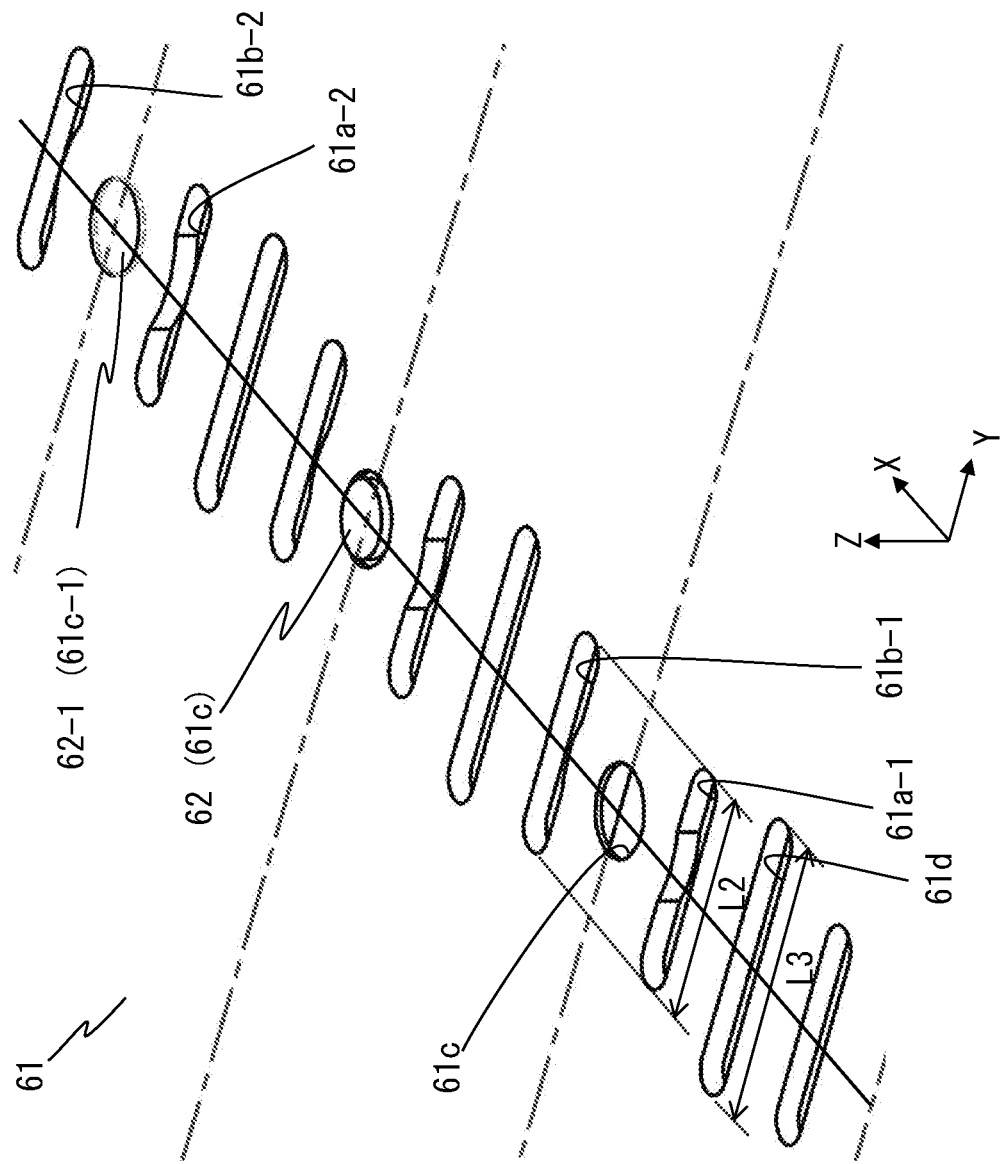
FIG. 6B is an enlarged perspective view for explaining the method of manufacturing an electric contact according to the sixth embodiment.

FIG. 6A and FIG. 6B are respectively a perspective view and an enlarged perspective view for explaining the method of manufacturing an electric contact according to the sixth embodiment.

The sixth embodiment is different from the second embodiment in that a slotted hole 61d, which is an example of second absorption hole positioned between welding positions in addition to slotted holes 61a and 61b, which are examples of one or more first absorption holes formed around a welding position, are formed on a base material 61 and can be similar to the first through fifth embodiments for the other aspects, and thus detailed explanations will be omitted.

First, pairs of slotted holes 61a and 61b, which are long in the Y directions and are examples of the first absorption holes, are formed (first absorption-hole formation step) around the welding positions of contact materials 62 on a base material 61, the slotted holes 61a and 61b facing each other in each pair having the welding position between them as illustrated in FIG. 6A and FIG. 6B.

Also, the base material 61 has slotted holes 61d formed on it as examples of the second absorption holes positioned between a plurality of welding positions arranged in one direction (X direction) as illustrated in FIG. 6B (second absorption-hole formation step). Note that the first absorption-hole formation step and the second absorption-hole formation step may be performed in any orders or may be performed in parallel.

Each of the slotted holes 61d is provided for example at the midpoint between two adjacent welding positions. Also, the slotted hole 61d has an open portion having length L3 (L3>L2) that is greater in the longitudinal directions (the Y directions) than each of the slotted holes 61a and 61b. Similarly to the slotted holes 61a and 61b, the slotted hole 61d is also formed to face the contact material 62 in a lateral direction (X direction) of the open portion. Similarly to the slotted holes 61a and 61b, the slotted hole 61d accommodates deformation of the base material 61 caused by the crushing of the contact material 62. Note that while the slotted hole 61*d* having semicircular portions at both ends in the longitudinal directions (the Y directions) is illustrated, the slotted hole 61*d* may be rectangular, without round portions.

Next, a concave portion 61*c* that accepts part of the welded contact material 62 is formed through coining (concave-portion formation step). The formation of this concave portion 61*c* causes deformation of the base material 61, reducing the volumes of the slotted holes 61*a* and 61*b* (slotted holes 61*a*-1 and 61*b*-1).

Next, the contact material 62 is welded to the base material 61 (welding step). The contact materials 62 are sequentially welded to the base material 61 at a plurality of welding positions arranged in one direction (X direction) as described in the first embodiment in this welding step.

Next, the contact material 62 is crushed (crushing step). In this crushing step, the contact material 62 is entirely press fit into the base material 61 (the contact material 62-1). The slotted holes 61*a*-1 and 61*b*-1 also accommodate the deformation of the base material 61 caused by this the contact material 62 being press fit into the base material 61, further reducing the volumes of the slotted holes 61*a*-1 and 61*b*-1 (slotted holes 61*a*-2 and 61*b*-2). Note that the crushing of the contact material 62 causes the concave portion 61*c* to have the same volume as that of the contact material 62 (61*c*-1).

The aspects of the above-described sixth embodiment similar to those of the above first through fifth embodiments can achieve effects similar to those achieved by the first through fifth embodiments, i.e., effects including the ability to absorb deformation of the base material 61 in the thickness directions (the Z directions) caused by the crushing of the contact material 62 on the base material 61.

Also, the contact materials 62 are sequentially welded to the base material 61 at a plurality of welding positions arranged in one direction (X direction), the slotted holes 61*a* and 61*b*, which are examples of one or more absorption holes, are formed around the welding positions on the base material 61, and the slotted holes 61*d*, which are examples of the second absorption holes at positions between the plurality of welding positions are further formed on the base material 61 in the welding step of the sixth embodiment. This can prevent a situation in which the formation of the concave portion 61*c* and the crushing of the contact material 62 cause the deformation of the base material 61 to influence an adjacent welding position.

While the first through sixth embodiments of the present invention have been explained above, the present invention is included in the scope of the inventions described in the claims and their equivalents. Below, the inventions described in the original claims of the present application as filed are added as appendixes.

APPENDIX 1

A method of manufacturing an electric contact, the method comprising:
a welding step of welding a contact material to a base material; and
a crushing step of crushing the contact material, wherein
one or more absorption holes that absorb deformation of the base material in a thickness direction caused by the crushing of the contact material are formed around the welding position of the contact material on the base material.

APPENDIX 2

The method of manufacturing an electric contact according to Appendix 1, wherein
the contact material is crushed to an extent that a surface of the contact material is coplanar with a surface of the base material in the crushing step.

APPENDIX 3

The method of manufacturing an electric contact according to Appendix 1 or 2, wherein
in the crushing step, the contact material is press fit into the base material only to a depth smaller than half a thickness of the base material that is before that contact material is crushed.

APPENDIX 4

The method of manufacturing an electric contact according to one of Appendixes 1 through 3, wherein
a total volume of the one or more absorption holes is greater than or equal to a volume of a portion, of the contact material, that is press fit into the base material.

APPENDIX 5

The method of manufacturing an electric contact according to one of Appendixes 1 through 4, wherein
the absorption hole is a slotted hole that has an open portion with a length greater in longitudinal directions than a diameter of the crushed contact material and that faces the contact material in a lateral direction of the open portion.

APPENDIX 6

The method of manufacturing an electric contact according to one of Appendixes 1 through 5, further comprising
a concave-portion formation step of forming a concave portion that accepts part of the welded contact material, to be performed prior to the welding step, wherein
the one or more absorption holes are formed prior to formation of the concave portion.

APPENDIX 7

The method of manufacturing an electric contact according to one of Appendixes 1 through 6, wherein
in the welding step, the contact material is welded to the base material through resistance welding, and thereafter the contact material is welded to the base material through ultrasonic deposition that utilizes horizontal vibration.

APPENDIX 8

The method of manufacturing an electric contact according to one of Appendixes 1 through 7, wherein
the contact material includes a first layer and a second layer that has a melting point lower than that of the first layer and that has a contact surface for the base material, and
an annealing step of performing annealing at a temperature lower than the melting point of the first layer is further included after the crushing step.

APPENDIX 9

The method of manufacturing an electric contact according to one of Appendixes 1 through 8, wherein
in the welding step, the contact materials are sequentially welded to the base material at a plurality of the welding positions arranged in one direction, the one or more absorption holes are one or more first absorption holes formed around the welding positions, and second absorption holes are further formed on the base material at positions between the plurality of welding positions arranged in one direction.

SYMBOLS 11, 21, 31, 41, 51, 61 BASE MATERIAL
11a, 11b, 21a, 21b, 31a, 31b, 41a, 41b, 51a, 51b, 61a, 61b, 61d SLOTTED HOLE
21c, 31c, 41c, 61c CONCAVE PORTION
12, 22, 32, 42, 52, 62 CONTACT MATERIAL
33, 43 CONTACT-MATERIAL-PROVIDING BELT SHAPED MEMBER
L1 DIAMETER OF CONTACT
L2 LENGTH IN LONGITUDINAL DIRECTION OF SLOTTED HOLE
N NUGGET

What is claimed is:

1. A method of manufacturing an electric contact, the method comprising:
a welding step of welding a portion of a contact material to a base material at each of a plurality of welding positions on the base material;
a crushing step of crushing, to a circular shape, the welded portion of the contact material at each of the plurality of welding positions on the base material; and
a concave-portion-formation step of forming, at each of the plurality of welding positions on the base material prior to the welding step, a concave portion that accepts part of the welded portion of the contact material,
wherein one or more absorption holes, each of which absorbs deformation of the base material in a thickness direction caused by the crushing of the portion of the contact material at a welding position in the plurality of welding positions on the base material, are formed prior to the formation of the concave portions, each absorption hole being formed with a distance from a welding position in the plurality of welding positions on the base material, each absorption hole being a slotted hole having an open portion with a length greater in longitudinal directions than a diameter of the crushed portion of the contact material, each absorption hole facing the contact material in a lateral direction of the open portion, a total volume of the one or more absorption holes formed with the distance from a given welding position being greater than or equal to a volume of the welded portion of the contact material that is press fit by the crushing step into the base material at the given welding position.

2. The method of manufacturing an electric contact according to claim 1, wherein:
the welded portion of the contact material is crushed to an extent that a surface of the welded portion of the contact material is coplanar with a surface of the base material in the crushing step.

3. The method of manufacturing an electric contact according to claim 1, wherein, in the crushing step, the welded portion of the contact material is press fit into the base material only to a depth smaller than half a thickness of the base material prior to the crushing step.

4. The method of manufacturing an electric contact according to claim 1, wherein:
the welded portion of the contact material includes a first layer and a second layer, the second layer having a melting point that is lower than a melting point of the first layer, the second layer having a contact surface for the base material; and
the method further comprises, after the crushing step, annealing at a temperature lower than the melting point of the first layer.

5. The method of manufacturing an electric contact according to claim 1, wherein:
in the welding step, the portions of the contact material are sequentially welded to the base material at the plurality of welding positions arranged in one direction;
the one or more absorption holes formed with a distance from each welding position in the plurality of welding positions are one or more first absorption holes formed with a distance from each welding position in the plurality of welding positions; and
one or more second absorption holes, which absorb deformation of the base material in the thickness direction caused by the crushing of the portions of the contact material at the plurality of welding positions, are further formed on the base material at positions between welding positions in the plurality of welding positions arranged in one direction.

* * * * *